Aug. 23, 1932.  E. C. MOGFORD ET AL  1,873,453
METHOD OF MAKING A FRONT AXLE
Filed April 7, 1930   3 Sheets-Sheet 1
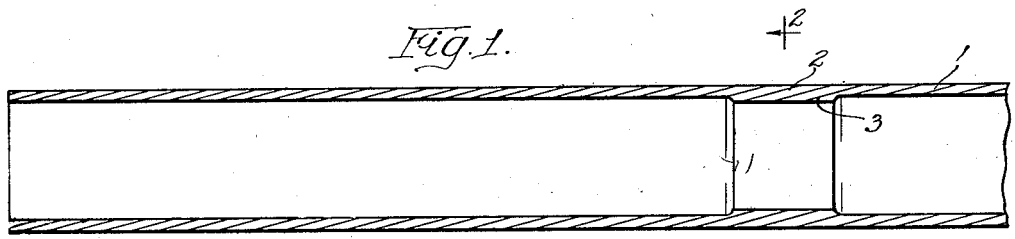
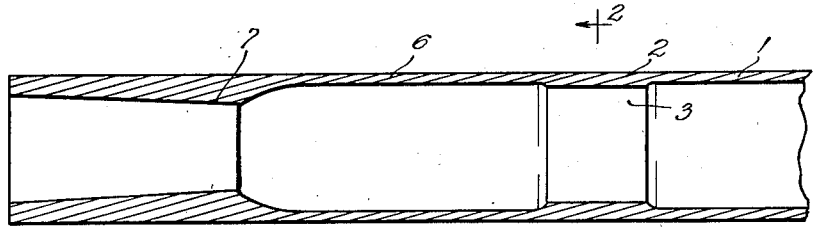
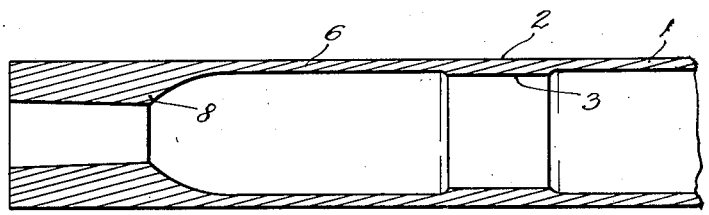
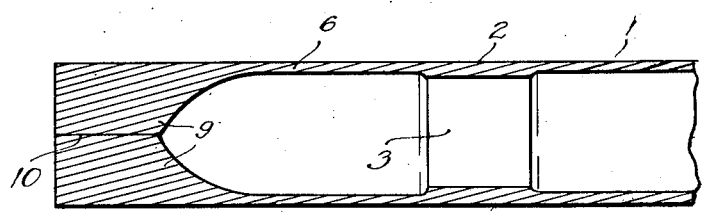
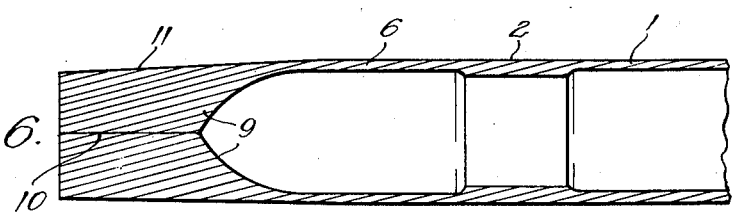
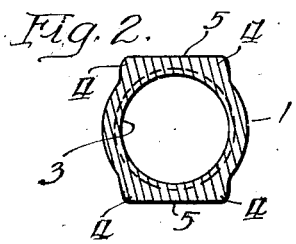
Inventors:
Edmund C. Mogford,
George Spatta.

Aug. 23, 1932.   E. C. MOGFORD ET AL   1,873,453
METHOD OF MAKING A FRONT AXLE
Filed April 7, 1930   3 Sheets-Sheet 2

Inventors:
Edmund C. Mogford
George Spatta
By Brown, Jackson, Boettcher & Dienner
Attys.

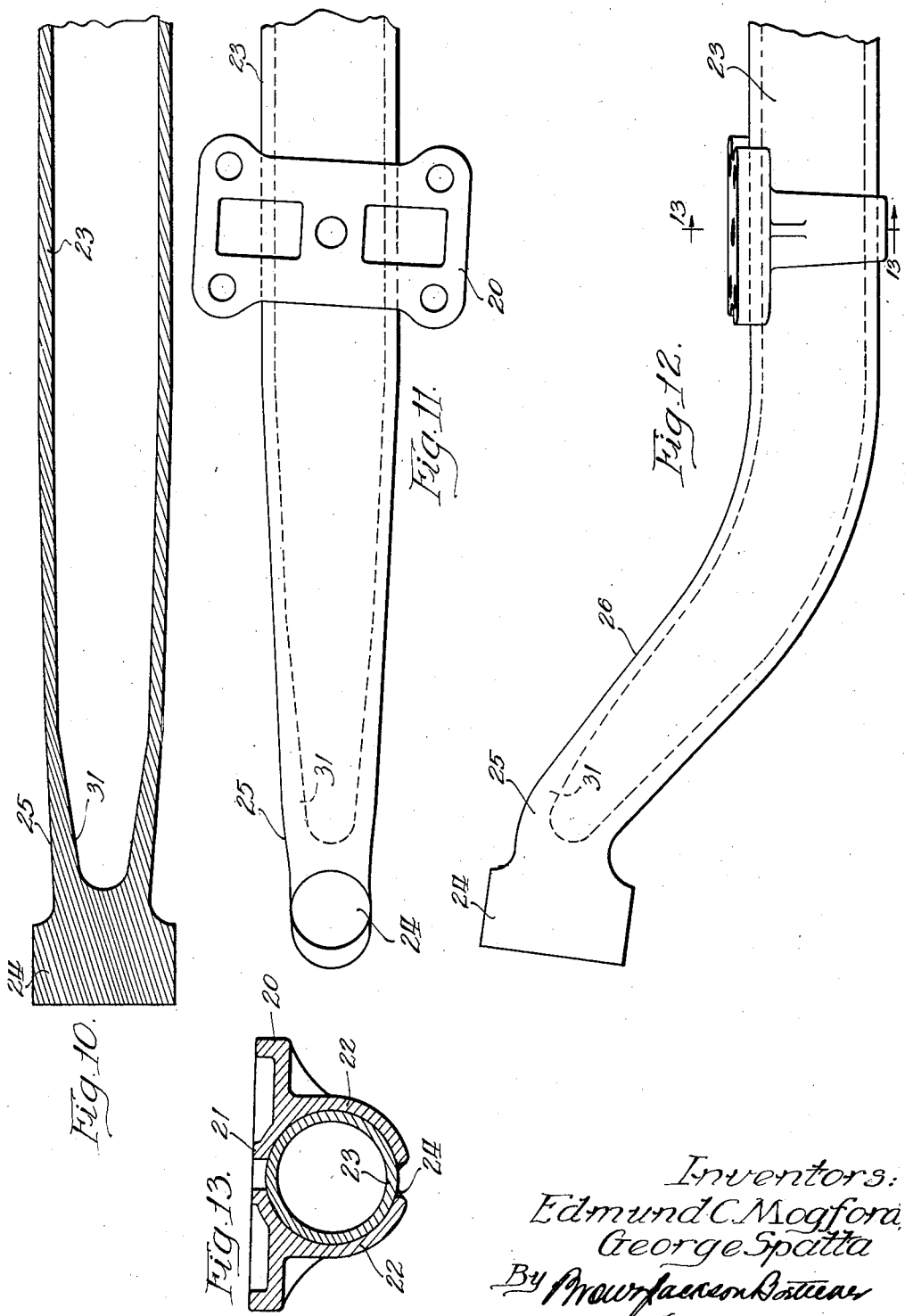

Patented Aug. 23, 1932

1,873,453

UNITED STATES PATENT OFFICE

EDMUND C. MOGFORD AND GEORGE SPATTA, OF BUCHANAN, MICHIGAN, ASSIGNORS TO CLARK EQUIPMENT COMPANY, OF BUCHANAN, MICHIGAN, A CORPORATION OF MICHIGAN

METHOD OF MAKING A FRONT AXLE

Application filed April 7, 1930. Serial No. 442,050.

Our invention relates to method of making a tubular front axle for automobiles and the like.

In automotive engineering, the tubular axle construction of the general type set out in the co-pending application of Edmund C. Mogford and George Spatta, Serial No. 363,-362, filed May 15, 1929, has made a distinct improvement because of the material reduction in unsprung weight accomplished through its use. The instant application, which may be considered as an improvement upon the above mentioned copending application, provides a tubular axle of the reversed Elliot type, in which the knuckle piece is forged integral with the axle proper, a construction which results in a further reduction in the weight of the axle and consequent reduction in the unsprung weight to be carried thereby. It provides a construction less expensive both as to material and as to labor cost.

In the manufacture of axles within the teachings of the present invention, we employ certain essential parts of the method of construction outlined in the copending application of Edmund C. Mogford and George Spatta, Serial No. 409,094, filed November 22, 1929, modifying the specific method therein disclosed to produce the axles forming the subject-matter of the instant application.

In the construction of axles of this type, a piece of seamless or welded steel tubing of outside diameter and length determined by the size of the particular axle being constructed and having a wall thickness of approximately three-sixteenths of an inch, is used as a blank in the forming of the axle. The operations performed in the fabrication of the axle include locally heating the blank in the region at which the spring supporting means is to be attached, and then upsetting this portion to increase its wall thickness by forcing metal inward, this operation being performed without altering the outside diameter of the blank. In the manufacture of a particular axle within the teachings of this invention, this operation includes a simultaneous forming of bosses or ears on the outside of the axle, which bosses together with the surface of the blank, form flat faces on the top and bottom sides of the axle, which faces are subsequently drilled and serve as abutments for the collar on the shank and for the nut of a bracket employed to attach the spring to the axle. This feature is optional.

The blank is then heated at its end section and upset to thicken the walls of that section, the upsetting operation being preferably performed in a plurality of steps, each of which moves metal to the inside of the blank without increasing its outside diameter. The last of these upsetting operations closes the end section of the blank, that is, the walls of the blank have been increased sufficiently to cause their inside surfaces to meet at the end of the blank. This operation is followed by a swaging operation which provides a slight taper on the end section of the blank, this operation also pressing the abutting interior walls of that section together in position for a subsequent forging operation.

The plurality of upsetting operation and the swaging operation performed on the end section of the blank are designed to be performed with a single heating of that section, that is, the operations are performed with sufficient rapidity that all may be completed before the blank has had time to cool down to such a temperature that it must be reheated for the successful performance of the operation.

The end section of the blank is then reheated to forging temperature, and squeezed to form it to a definite taper, and then coined to form the knuckle piece of a reversed Elliot type axle, this squeezing and forming operation compressing the abutting surfaces of the inside walls of the end sections together to form that section into a solid integral mass. They may be welded together if desired.

The coining operation which forms the exterior surfaces of the knuckle piece may be performed by any type of suitable dies, which dies will generally leave metal splashes or fins at the points at which the die structure is joined together, which splashes or fins are trimmed by a subsequent operation.

The final operations include heating the axle throughout its entire length and quenching it in a suitable medium to temper it to the proper degree of hardness, the quenching preferably being performed while the blank is gripped in dies which form the axle to its required shape, as disclosed in our copending application.

The axle formed in this manner is light, strong and of pleasing appearance. In certain instances where the spring pad that is to be attached to the axle and to form a seat for the spring, is of the type which completely encircles the tubular portion of the axle, it will be unnecessary to thicken the walls of the tube beneath the spring seat, and we therefore contemplate omitting this operation in the fabrication of this type of axle.

Now, to acquaint those skilled in the art with the teachings of this invention, reference is made to the accompanying drawings in which the method of forming a preferred embodiment of the invention is shown by way of example, and in which:

Figure 1 is a cross-sectional view taken lengthwise through the tubular blank at the completion of the upsetting of the walls of the blank beneath the spring support;

Figure 2 is a cross-sectional view of Figure 1 taken along the line 2—2 looking in the direction of arrows and showing bosses raised in the outside surface of the blank to form flat faces on the top and bottom sides of the axle;

Figure 3 is a cross-sectional view through the blank after the performance of the first step in the upsetting operation of the end of the blank;

Figure 4 is a cross-sectional view taken through the blank at the completion of the second step in the upsetting operation;

Figure 5 is a similar view at the completion of the third step in the upsetting operation;

Figure 6 is a similar view taken at the completion of the swaging operation on the closed end of the blank;

Figure 10 is a cross-sectional view through a blank after the completion of the squeezing and coining operations to form an axle of a slightly different type from the axle shown in the foregoing figures;

Figure 11 is a plan view of a completed axle of the type shown in Figure 10 with the spring pads mounted thereon;

Figure 12 is an elevational view of the axle shown in Figure 11; and

Figure 13 is a cross-sectional view of the axle shown in Figure 12 taken along the line 13—13 looking in the direction of the arrows.

Figure 7:
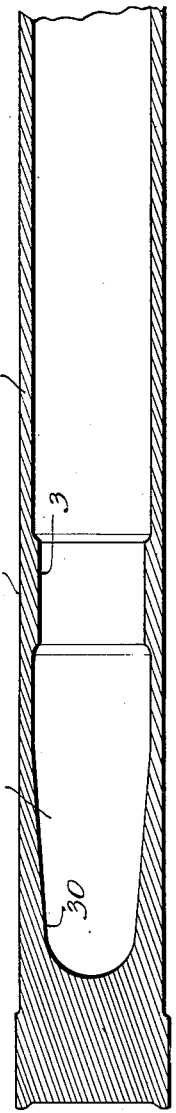
Figure 7 is a cross-sectional view taken along a longitudinal vertical plane through the axle at the completion of the squeezing operation, this view showing also the shape of the knuckle piece at the end of the coining operation.

Referring to the drawings, now, in more detail, the front axle is made from a piece of seamless tubing of a diameter dependent upon the particular type of axle being constructed and of a length sufficient to supply the metal that is required in the fabrication of the axle. In the axle shown in the drawings, which is shown by way of example, the tube is two and one-half inches in diameter and has a wall thickness of three-sixteenths of an inch.

The first operation performed upon this blank is heating it at a point at which the spring supporting means is to be subsequently attached, the walls of the blank 1 then being gripped in a suitable forging die and upset at a point 2 through the operation of a punch associated with that die. The particular type of punch and die employed for this operation is not of the essence of the present invention and is therefore omitted from the drawings. Preferably, however, the punch and die are formed so that the walls of the blank 1 are thickened by moving metal inward to form an inner ring 3, this operation being performed without decreasing the perimeter of the outside diameter of the blank 1.

In certain types of front axles, particularly those in which the spring on which the chassis of the vehicle is supported runs parallel to the longitudinal axis of the axle, it is customary to attach the spring to the axle by a hanger which has a bolt forged integral with it. This bolt projects through the axle itself, and is held thereon by a nut and washer on the underside of the axle.

To mount this type of a housing, the upsetting operation which thickens the walls at the point 2 is also employed to form bosses 4 on the outside surface of the tubular blank, these bosses and the peripheral surface of the blank together forming flat surfaces 5 on the upper and lower faces of the axle, the upper face serving as a square seat for the shoulder on the hanger bolt and the lower face as a seat for the washer and nut employed to lock that bolt on the axle. By suitable arrangement of the die, we form these bosses 4 on the blank at the same time that we upset that blank to thicken its walls as shown at 3 in Figure 1. In this embodiment of our invention the perimeter of the blank is actually increased by the upsetting operation, metal being gathered through a shortening of the blank to form this increased perimeter and to simultaneously thicken the walls. The increased thickness of the walls supplies sufficient strength to compensate for the drilling of the tubular housing to permit the insertion of the hanger bolt therein.

In certain other types of axles manufactured within the teachings of this invention, a spring seat that has arms which completely encircle the axle, is employed, in which case it is unnecessary to upset the blank under the spring seat to thicken its walls since the strength of the thin wall tubing itself is sufficient to resist the strain placed on it during the service of the axle. A spring pad as described in our copending application, Serial No. 409,095, may be employed.

Upon the completion of the upsetting operation just described, the end sections of the axle are then heated to forging temperature, and the blank is then clamped in a suitable die preparatory to upsetting these end sections to shorten them and thicken their walls. Since the amount of metal to be moved is more than can be successfully moved in a single operation, we propose to perform this upsetting of the arm in a plurality of steps, all of which is accomplished during one heating of the section, that is, the successive steps are performed with sufficient rapidity and with the loss of only so much heat that all may be completed before the blank has had time to cool down sufficiently to necessitate its being reheated to the proper forging temperature.

In Figure 1, we show a cross-sectional view of the blank after the first step in the end upsetting operation has been performed. Considering the arm 6 as the entire portion the blank extending beyond the spring seat 2, of this arm is first shortened by moving the extreme outer end of it inward, the metal so disturbed being confined against outward escape and flowing inward to form the thickened walls 7. It will be noted that the outside diameter of the arm 6 at the point adjacent this increased wall thickness, is the same as that of the original blank 1, that is, the operation is performed by moving metal inwardly rather than outwardly.

Upon completion of the operation shown in Figure 3, the blank is brought into registration with another forging punch and die which is then operated to continue the thickening of the walls at the end of the arm 6, forming lugs of metal 8 on the inside of this section, this operation also being performed without affecting the outside diameter of the blank.

The third step in this upsetting operation moves the metal in the end of the arm 6 so that the walls of the enlargement 9 on the inside thereof abut each other.

The blank is then moved to a swaging die which engages the outer surface of the arm 6 and forms the end of it into a tapered portion 11, shown in Figure 6. This tapering may be on a circular section but preferably is on an oblong section such as an ellipse or a flattened ellipse. It will be noted that the enlargement 9 is lengthened by this swaging operation.

The particular dies, punches and clamps employed in the performance of this end upsetting operation, are not of the essence of the present invention and have been omitted from the drawings as unnecessary.

By the use of properly designed dies and punches, the step in the upsetting and swaging operation shown in Figures 3 to 6, inclusive, can be performed before the blank has had a chance to cool down sufficiently to necessitate its being reheated, although the blank, when swaged, as shown in Figure 6, will not be sufficiently hot to properly weld the abutting surfaces 10 of the lug or enlargement 9.

The blank is then reheated to bring its end portion to the proper forging temperature, and squeezed and coined preferably in a three part die to form the knuckle piece of reversed Elliot type axle on the end of the arm 6.

Figure 8:
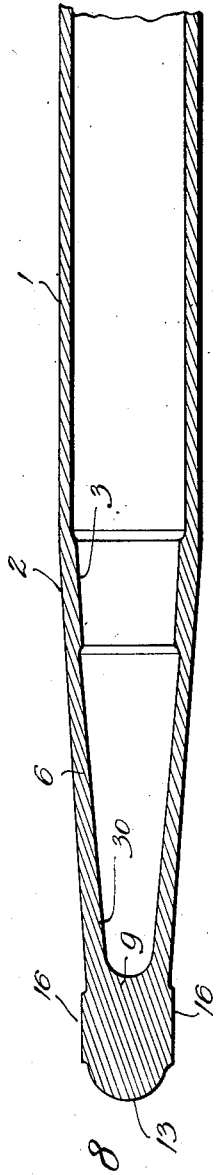
Figure 8 is a view similar to Figure 7 taken along a longitudinal horizontal plane to the axle showing the taper formed in the arm of the axle by the squeezing operation.
Figure 9:
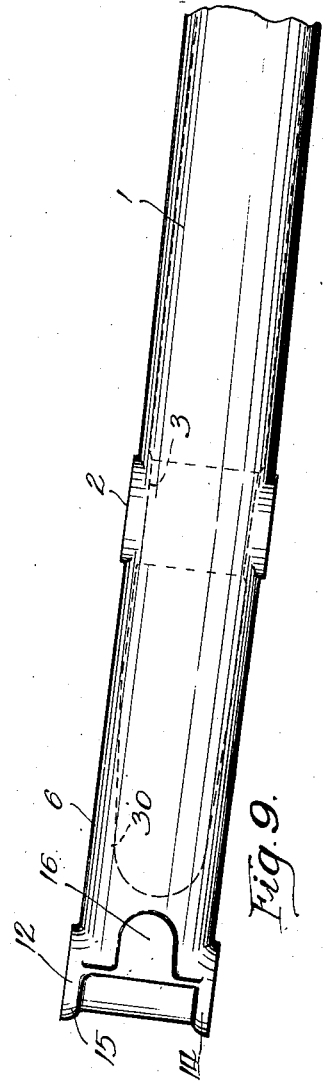
Figure 9 is an elevational view of the end section of an axle after the completion of the coining, trimming and forming operations.

In Figures 7, 8 and 9, we show a blank at the completion of these operations. The squeezing operation, which can be best seen in Figure 8, forces the metal in the lug 9 inward, pressing or if desired welding the above edges 10 together so that the end of the blank is closed by an integrally formed mass of metal. The coining operation, which forms the knuckle piece 12 is performed by a suitably shaped die preferably comprising two jaws moving laterally against the flattened sides to grip die neck and an endwise movable jaw forced against the end 13 of the arm, this die shortening the distance between the inner and outer faces of the lug of metal 9 by which the end of the blank is now closed. This operation also increases the height of the knuckle piece 12 so that it extends above the arm 6 of the blank, and forms flanges 14 and 15 on the lower and upper edges of this knuckle piece, respectively. The bosses 16 and 17 are formed in this same operation, serving as parallel faces against which the head and nut of a through bolt or pinch pin abut, the through bolt being employed to lock the spindle bolt in the knuckle piece in accordance with established practice.

The dies employed to coin and squeeze the arms of the axle are separating dies so that the finished product can be removed from them, and as such are apt to leave flashes of metal projecting outward from the surfaces of the finished product, which flashes are removed by a trimming operation.

The axle is completed by operations performed in similar sequence on its opposite ends, and when so finished, is heated throughout its entire length in a suitable furnace. The final shaping of the axle and heat treatment of it are performed after this heating, preferably in a device of the kind disclosed in the copending application of Edmund C. Mogford and George Spatta, Serial No. 409,096, filed November 22, 1929, although any other preferred arrangement may be used in lieu thereof. The axle shown in Figures 7 to 9, inclusive, is formed as an arc of a circle by this treating and forming operation, the radius of that circle being substantially greater than the overall length of the finished axle. This finished axle is of the Ford type.

In Figures 10 to 13, inclusive, we disclose an axle of a slightly different type which can be made in accordance with the teaching of the present invention. The tubular blank from which this axle is made may be of substantially the same dimensions as mentioned heretofore, but since this axle employs a spring seat 20 having a flat upper face 21 and embracing arms 22, which arms practically completely encircle the tubular member 23 of the axle, it is not necessary to upset the metal beneath this spring support 20 since the arm when welded to it as shown at 24 sufficiently reinforces it to enable it to withstand the stresses placed on it during the service of the axle. Such preliminary thickening may however be performed where the customer desires the same.

The end sections of the blank are heated and upset in the manner set forth in Figures 3 to 6, inclusive, and the blank so formed is then squeezed and coined to form the knuckle piece 24 and taper arms 25 shown in Figure 10. The metal at the neck or junction of the knuckle piece and arm of the axle being shaped into a slightly different shape in this embodiment of the invention and in the one discussed hereinbefore. The axle so formed is then heated throughout its entire length and shaped to its final shape in a device preferably of the type disclosed in the last mentioned copending application of Mogford and Spatta, the completed axle having a main part 23 and arms 26 which are bent upward therefrom on a relatively short radius, with the axis of the knuckle piece 24 finally disposed at an angle to the axis of the main portion 23 of the axle by a relatively short bend in the neck 25.

It will be observed that in both of the modifications of my invention disclosed herein, the wall thickness of the arms of the axle increases as the outward end of the axle is approached, as will be seen at points 30 in Figures 7 to 9 and 31 in Figures 10 to 12, inclusive. This increase in the wall thickness of the arm reinforces it to make it sufficiently strong to easily withstand the shocks and stresses to which the arm will be subjected during the use of the axle.

Axles constructed in accordance with the foregoing operations are materially lighter than either the solid forged I-beam axles commonly used heretofore and also lighter than the tubular axles disclosed in the above mentioned copending application of Mogford and Spatta, being lighter than these latter axles because of the elimination of the forged knuckle piece which is inserted in a socket formed in the end of the arm as disclosed in those applications. Obviously, the invention disclosed herein may be employed to form axles of the types other than illustrated, and the illustrations are made by way of example only and we are not to be limited to the specific details disclosed. While we have shown the upsetting of the end or arm section of the blank as performed in three upsetting and one swaging operation, obviously, a greater or lesser number of steps can be employed as required to shape the metal to the requirements on the particular axle then being manufactured. The knuckle pieces shown in the drawing are of the reverse Elliot type, it being obvious that other types of knuckle pieces may also be forged integral with the tubular axle within the teaching of my invention.

Having thus described our invention what we consider new and desire to have protected by Letters Patent is pointed out in the appended claims.

What is claimed is:—

1. The method of forging a tubular front axle from a blank of tubing which comprises, upsetting the blank at a point spaced back from its end to thicken its walls at the point of maximum stress, upsetting the end to thicken the walls and thereby close the end of the blank, swaging the end to taper it, squeezing the end to form a tapered arm of oblong cross section, coining the end to form the knuckle piece of a reverse Elliot type axle, and heat treating and forming the axle.

2. The method of forging a tubular front axle from a blank of tubing which comprises, upsetting the blank at a point spaced back from its end to thicken its walls at the point of maximum stress, and to form flat faces on opposite sides of the tubing, upsetting the end to thicken the wall and thereby close the end of the blank, swaging the end to taper it, squeezing the end to form a tapered arm of oblong cross section, coining the end to form the knuckle piece of a reverse Elliot type axle, and heat treating and forming the axle.

3. The method of forging a tubular front axle from a blank of tubing which comprises, upsetting the blank at a point spaced back from its end to thicken its walls at the point of maximum stress, and to form flat faces on opposite sides of the tubing, upsetting the end to thicken the walls and thereby close the end of the blank, swaging the end to taper it, squeezing the end to form a tapered arm of oblong cross section, coining the end to form the knuckle piece of a reverse Elliot type axle, disposed with its axis intersecting the planes of said flat faces, and heat treating and forming the axle.

4. The method of forging a tubular front axle from a blank of tubing which comprises, upsetting the blank at a point spaced back from its end to thicken its walls at the point of maximum stress, and to form parallel flat faces on opposite sides of the tubing, upsetting the end to thicken the walls and thereby close the end of the blank, swaging the end to taper it, squeezing the end to form a tapered arm of oblong cross section, coining the end to form the knuckle piece of a reverse Elliot type axle, and heat treating and forming the axle.

5. The method of forging a tubular front axle from a blank of tubing which comprises, upsetting the blank at a point spaced back from its end to thicken its walls at the point of maximum stress and to form parallel flat faces on opposite sides of the tubing, upsetting the end to thicken the walls and thereby close the end of the blank, swaging the end to taper it, squeezing the end to form a tapered arm of oblong cross section, coining the end to form the knuckle piece of a reverse Elliot type axle disposed with its axis at right angles to the planes of said flat faces, and heat treating and forming the axle.

6. The method of forging a tubular front axle from a blank of tubing which comprises, upsetting the blank at a point spaced back from its end to thicken its walls at the point of maximum stress by forcing metal inward of the tubing, and to simultaneously form spring supports by forcing metal outward, upsetting the end to thicken the walls and thereby close the end of the blank, swaging the end to taper it, squeezing the end to form a tapered arm of oblong cross section, coining the end to form the knuckle piece of a reverse Elliot type axle, and heat treating and forming the axle.

7. The method of forging tubular front axles which comprises, upsetting the end of a thin walled tube in a plurality of steps the last of which closes the end of the tube without affecting its outside diameter, swaging the closed end of the tube to taper it, squeezing the end of the tube to weld the closed end walls together and forming the closed end into a knuckle piece.

8. The method of forging tubular front axles which comprises, upsetting the end of a thin walled tube in a plurality of steps, each of which thickens the tube walls by gathering metal on the inside of it without increasing its outside dimension, the last of said steps substantially closing the end of the tube without affecting its outside diameter, swaging the closed end of the tube to taper it, squeezing the end of the tube to close the end walls together and forming the closed end into a knuckle piece.

9. The method of forging a tubular front axle from a piece of tubing which includes the following steps, viz., locally heating the tubing at a point spaced back from its end, upsetting the heated portion to thicken its walls and to form a spring support, heating the end of the tube, upsetting the end to thicken its wall sufficiently to close the end of the tubing, swaging a taper on the end of it to seat the thickened walls, reheating the end section of the tubing, squeezing the end to form it into a tapered arm and to weld the thickened walls together, coining the end to form the knuckle piece of a reverse Elliot type axle, trimming the end section, and heat treating and forming the axle.

10. The method of forging a tubular front axle from a piece of tubing which includes the following steps, viz., locally heating the tubing at a point spaced back from its end, upsetting the heated portion to thicken its walls and to form a spring support, heating the end of the tube, upsetting the end to thicken its wall sufficiently to close the end of the tubing, swaging a taper on the end of it to seat the thickened walls, reheating the end section of the tubing, squeezing the end to form it into a tapered arm of oblong section and to weld the thickened walls together, coining the tapered section to form the knuckle piece of a reverse Elliot type axle, trimming the knuckle piece, and heat treating and forming the axle.

11. The method of forming a tubular axle, which comprises providing a steel tube of substantially uniform cross-section throughout its length, heating an end portion of said tube, confining the outside of the heated portion, repeatedly upsetting the end until a substantial portion of the tube is solid, and shaping the solid end to provide bearings for stub axle knuckles.

12. The method of forming a tubular axle which comprises providing a steel tube of substantially uniform cross-section throughout its length and of greater length than required for the finished axle, heating a substantial end portion of said tube, repeatedly upsetting the end of said tube until the end portion of the tube is solid for an appreciable length, swaging the tube so that the body of the tube tapers gradually to the solid end, and forging the solid end to provide bearing portions for stub axle members.

13. The method of forming a tubular axle which comprises providing a steel tube of greater length than required for the finished axle, heating a substantial portion of the tube end, repeatedly upsetting said end until the tube is solid for an appreciable length, forging the solid end to the desired shape, clamping the tube intermediate its ends, and repeating the above steps on the opposite end.

14. The method of forming a tubular axle which comprises providing a steel tube of substantially uniform cross-section throughout the length and of greater length than is required for the finished axle, heating an end portion of the tube, repeatedly upsetting said end portion until solid for a predetermined extent, forging the solid end to the desired shape, and thereafter repeating the above operations in connection with the opposite end of the axle.

In witness whereof, we hereunto subscribe our names this 1st day of April, 1930.

EDMUND C. MOGFORD.
GEORGE SPATTA.